UNITED STATES PATENT OFFICE.

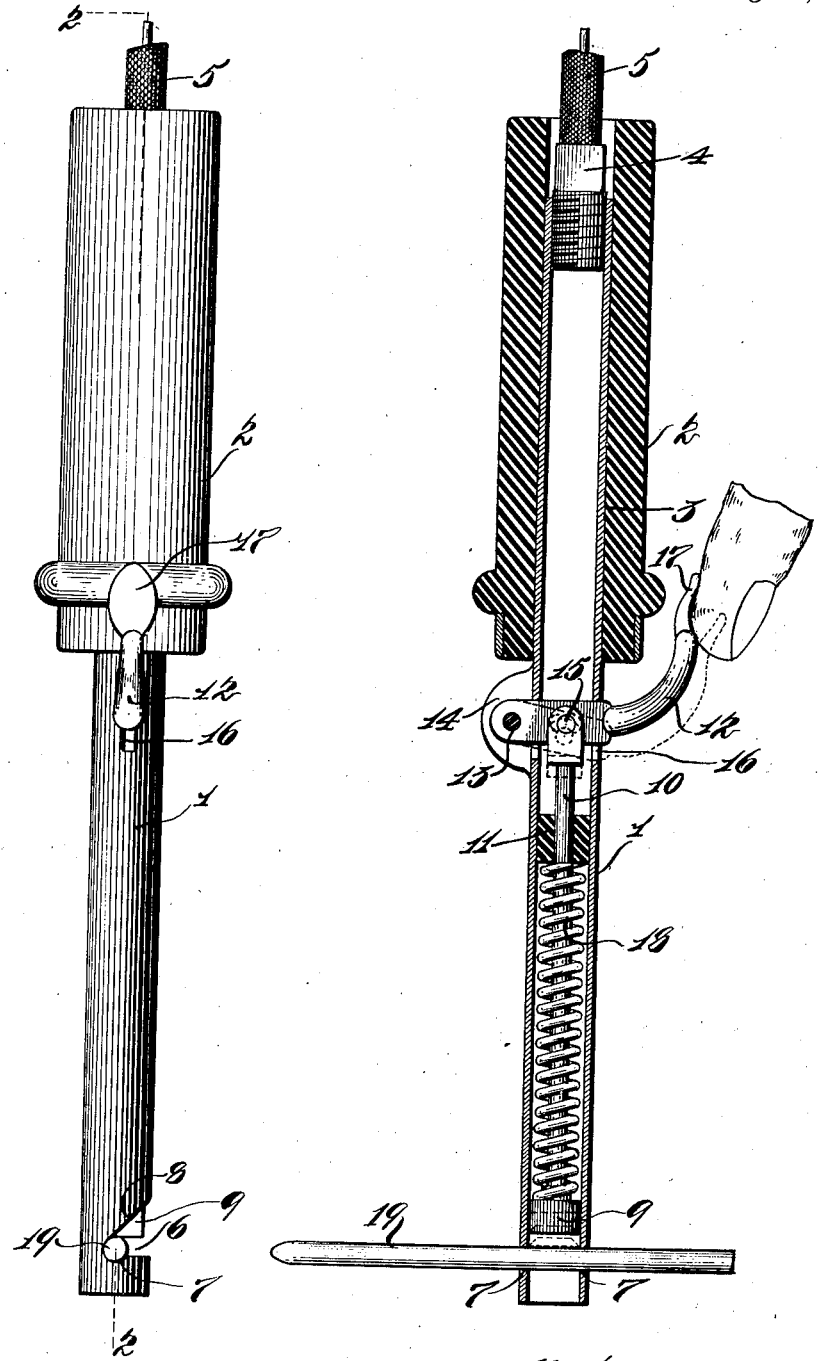

GEORGE HILLS, OF WESTFIELD, NEW JERSEY.

ELECTRODE-HOLDER.

1,069,697.

Specification of Letters Patent. Patented Aug. 12, 1913.

Application filed November 26, 1912. Serial No. 733,629.

*To all whom it may concern:*

Be it known that I, GEORGE HILLS, a subject of the King of Great Britain and Ireland, residing at Westfield, New Jersey, have invented certain new and useful Improvements in Electrode-Holders, of which the following is a clear, full, and exact description.

This invention relates to an electrode holder, for the purpose of holding one of the electrodes such as used in the electric welding process, and the objects of the invention are to provide a holder for such purpose which is adapted to enable the operator to readily discard the stub of the electrode and to insert a new electrode, with a minimum amount of delay and trouble, whereby the rapidity of the welding process is facilitated.

Further objects are to provide a durable, efficient and practical electrode.

With these ends in view, my invention consists of certain features of construction and combinations of parts to be hereinafter described and then claimed with reference to the accompanying drawings showing a desirable embodiment of the invention, and in which—

Figure 1 is an elevation of the improved electrode holder; and Fig. 2 is a longitudinal section thereof on the line 2—2 Fig. 1.

Referring to the drawings, the tubular stem or shank 1 of the holder is of conducting material for the purpose of conducting the current. Said stem or shank has a wooden or non-conducting handle 2, said handle being bored out at 3 to receive one end of said stem or shank. Preferably the connection is such that the parts are held together by friction. A terminal 4 is attached to the handle extremity of the stem or shank 1, this being the terminal for the feed wire or cable 5 for the current.

The stem or shank 1 which may be said to constitute a conducting member is provided at its outer end with an opening or recess 6, preferably of sufficient depth so that an electrode 19 when seated in said opening or recess will lie transversely of said member or shank so that the longitudinal axis thereof will pass diametrically through said electrode. By forming an opening or recess 6 in said stem or shank, a fixed jaw 7 is provided for said holder. One side wall 8 of said recess is preferably inclined as shown, so that said recess flares outwardly to enable the guiding and seating of the electrode into the same. A movable opposing jaw 9 is provided which is guided in the tubular member, the same being carried by a rod or plunger 10, which is operable by a lever arm 12. Said arm is pivoted at 13 to a projection 14 on said stem or shank, and the arm is connected with said rod or plunger 10 by a pivot 15. Opposite the projection 14 a slot 16 is provided in the tubular member 1 and through said slot the lever arm 12 protrudes. The outer end of said lever arm is bent or extends laterally to a point opposite the inner end of the handle 2 and is formed with a thumb piece 17. A helical spring 18 is located within the tubular member 1 and surrounds the rod or plunger 10, it being seated at one end against the inner side of the movable jaw 9 and at the other end against a perforated guide block or bushing 11. The tendency of said spring is to urge or move the movable jaw 9 toward the other jaw 7.

The improved electrode holder is operated as follows: To grasp an electrode such as 19, the same is inserted sidewise into the recess 6 until it is seated at the inner end of the same upon the jaw 7. It will be noticed that the spring 18 causes the movable jaw 9 to automatically grip the electrode. The electric welding process can now be proceeded with in the usual manner, the holder being ordinarily held in horizontal position, the hand gripping the handle 2. To discard the stub of the electrode, the operator presses the thumb upon the thumb piece 17, thereby compressing the spring 18 and retracting the jaw 9, whereupon the electrode stub is freed and can be disengaged from the holder.

What I claim as new is:—

1. In an electrode holder, the combination of a handle, electrode gripping means, conducting means connecting said parts, said gripping means comprising jaws and mechanism whereby one of said jaws is urged in a direction away from said handle, and means whereby through hand pressure of the operator toward the said handle the jaws of said gripping means are opened.

2. In an electrode holder, the combination of a handle, a conducting member thereon provided with a fixed jaw, a movable jaw coöperating with said jaw for gripping an electrode, a spring normally urging said movable jaw away from said handle toward said fixed jaw, and manually operated means for withdrawing said movable jaw.

3. In an electrode holder, the combination of a tubular conducting member provided with a fixed jaw, a movable jaw coöperating with said jaw and located in said conducting member for gripping an electrode, a spring normally urging said movable jaw toward said fixed jaw, and manually operated means acting on the same side of said movable jaw as said spring for withdrawing said movable jaw.

4. In an electrode holder, the combination of a handle, a tubular conducting member thereon having an open side-recess providing a fixed jaw, a movable jaw coöperating with said jaw and located in said conducting member for gripping an electrode, a spring normally urging said movable jaw toward said fixed jaw, and manually operated means extending toward said handle for withdrawing said movable jaw.

5. In an electrode holder, the combination of a tubular member provided with a jaw, a handle for said member, a movable jaw opposing said jaw to grip an electrode, a lever arm pivoted to said member and extending into coöperative relationship with said handle, connecting means between said arm and movable jaw, and a spring acting on said movable jaw to urge it away from said handle and toward said other jaw.

6. In an electrode holder, the combination of a tubular member having an open side-recess providing a jaw, a handle for said member, a movable jaw located in said member and opposing said jaw to grip an electrode, a lever arm pivoted to said member and extending into coöperative relationship with said handle, connecting means between said arm and movable jaw, and a spring seated in said tubular member and acting on said movable jaw to urge it toward said other jaw.

7. In an electrode holder, the combination of a tubular conducting member having an open side-recess providing a jaw, a non-conducting handle for said member, a movable jaw located in said member and opposing said jaw to grip an electrode, a lever arm pivoted to said member and extending into coöperative relationship with said handle, a rod connecting said arm and movable jaw, and a spring seated in said tubular member and acting on said movable jaw to urge it toward said other jaw, said handle having a recess to receive the terminal of an electric conducting wire or cable for electric connection with said tubular member.

8. In an electrode-holder, the combination of a handle, a conducting member connected at one end with said handle and provided with an open-side recess providing a jaw at the other end, and into which recess an electrode can be inserted laterally, a movable jaw opposing aforesaid jaw, means between said movable jaw and said handle tending to urge said movable jaw away from said handle and toward said other jaw, and means extending to a point alongside said handle for withdrawing said movable jaw.

Signed at New York city, New York, this 20th day of November, 1912.

GEORGE HILLS.

Witnesses:
 BEATRICE MIRVIS,
 GEO. L. WHEELOCK.